(12) United States Patent
Penna (10) Patent No.: US 6,842,124 B2
(45) Date of Patent: Jan. 11, 2005

(54) VARIABLE LENGTH DECODER

(75) Inventor: David E. Penna, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 184 days.

(21) Appl. No.: 10/246,169

(22) Filed: Sep. 18, 2002

(65) Prior Publication Data

US 2003/0118114 A1 Jun. 26, 2003

(30) Foreign Application Priority Data

Oct. 17, 2001 (GB) .............................. 0124882

(51) Int. Cl.[7] ........................... H03M 7/00; H03M 7/40
(52) U.S. Cl. ...................................... 341/67; 341/106
(58) Field of Search ............................ 341/67, 106, 51, 341/65, 59; 375/345; 711/200; 708/277

(56) References Cited

U.S. PATENT DOCUMENTS

| | | | | |
|---|---|---|---|---|
| 5,600,812 A | * | 2/1997 | Park ........................... | 711/200 |
| 5,604,499 A | * | 2/1997 | Miyagoshi et al. ........... | 341/67 |
| 5,841,380 A | * | 11/1998 | Sita et al. ..................... | 341/67 |
| 6,101,221 A | | 8/2000 | Varanasi et al. ............. | 375/240 |
| 6,122,316 A | | 9/2000 | Varanasi et al. ............. | 375/240 |
| 6,215,424 B1 | * | 4/2001 | Cooper ......................... | 341/67 |
| 6,707,865 B2 | * | 3/2004 | Challa ......................... | 375/345 |

FOREIGN PATENT DOCUMENTS

WO  WO 03/034746  *  4/2003

OTHER PUBLICATIONS

"Parallel Variable Length Decoding with Inverse Quantization for Software MPEG–2 Decoders"—D. Ishii et al, IEICE Trans. Fundamentals, vol. E84–A, No. 12, Dec. 2001.
"Design and Hardware Implementation of a Memory Efficient Huffman Decoding"—R. Hashemian. IEEE Transactions on Consumer Electronics, vol. 40, No. 3, Aug. 1994.

* cited by examiner

*Primary Examiner*—Patrick Wamsley (57) ABSTRACT

Variable length decoding of DCT coefficients in MPEG video data is performed using a standard processor (400) and a small look-up table (LUT 530). The processor performs (520) an integer to floating point conversion on a portion the received bitstream (BS). By this step, lengthy codewords with many leading zeros, which are common in the codebook, are represented in a compressed form by the exponent and mantissa fields (EXP, MAN) of the floating point result (FP). The relevant bits are extracted and used as an index (IX) to address the LUT. This avoids cumbersome bit-oriented logic, while also avoiding a very large LUT that would otherwise be required to represent the same codebook. The entire LUT may thus reside in cache memory (410). In a VLIW processor implementation, decoding of one token is pipelined with the inverse scan and inverse quantisation step of the preceding token(s).

21 Claims, 5 Drawing Sheets

VARIABLE LENGTH DECODER

The invention relates to methods and apparatuses for decoding digital data streams which have been encoded using variable length codes. The invention finds particular application in the decoding of compressed video bitstreams such as MPEG streams using general purpose microprocessors or DSP (digital signal processor) chips. The invention can equally be applied to variable-length coding schemes used for data compression in a range of circumstances including text, audio and voice compression. The present description refers to MPEG decoding by way of example only.

The MPEG video compression standard uses motion-compensated block-based transform coding to reduce the quantity of data (and as a consequence transmission bit-rate) required to portray motion picture sequences. The building blocks of an MPEG image frame are macroblocks, within which pixel data is encoded in blocks of 8×8 pixels. Luminance and chrominance data are processed as separate blocks.

In general, neighbouring pixels of a typical image tend to be highly correlated. MPEG coding applies a Discrete Cosine Transform (DCT) to each block for concentrating randomness into fewer, decorrelated parameters known as DCT coefficients. The 8×8 matrix of coefficients is then quantised to reduce the number of bits required for coding, and in particular to reduce as many of the DCT coefficients to zero, as possible within the boundaries of the prescribed bit-rate and video quality parameters.

To permit efficient use of Run Length Coding, the 64 coefficients of the 8×8 matrix are re-ordered into a sequence of values by way of a 'zig-zag' or other scan pattern, such that the zeros and lower value coefficients will tend to trail the higher-valued ones coefficients, and to code the sequence so that the zeros are represented by a pair of numbers representing the run-length (the number of consecutive zeros) and a level (the value of the first non-zero coefficient following the run of zeros). These pairs are translated by a process called Variable Length Coding (VLC) into 'Huffmann' coded tokens, (codeword) coded so that those with the most probable occurrence are given the shortest code, and the least probable occurrence are given the longest codes. Tokens that are not particularly likely to occur are coded with Escape Sequences (ESC). Also, all zeros in the sequence that are not followed by a weighted coefficient are eliminated entirely, replaced by an End Of Block (EOB) token. A fixed size array of video is therefore converted to a variable length stream of bits, typically a small fraction of the original size.

Further features are used to maintain predictable transmission rate and/or video quality, but their detail is not required for the purpose of this Application. The motion-related features of MPEG have not been described, as they do not relate to the improved VLD.

Decoding the bitstream generally uses the reverse process of the steps used for encoding. An inter-frame decoder requires an input stream buffer, a Variable Length Decoder (VLD), an inverse quantiser, an Inverse Discrete Cosine Transform (IDCT) and an output interface. However, as it is necessary to fix the playback video rate, time constraints exist. The VLD can be expensive to implement in a software-based MPEG decoder, as it must operate on a bit-wise basis, with conversions from variable length codes to DCT coefficients at speeds up to the input bit-rate. VLD decoders need to look at every bit because the boundaries between variable length codes are random and non-aligned. While hardware decoders can be designed to operate bit-by-bit general purpose processors are designed to operate on fixed groups of 8, 16, 32 or even 64 bits, and operations that do not respect these boundaries become extremely inefficient.

Known methods for overcoming processing bottlenecks are, for example, the use of parallel processing, dedicated logic arrays, or caching often-used data in very-high speed memory. However, these solutions do not provide the most effective solution to MPEG stream decoding as they do not overcome the consequences of low-probability events, such as cache stalls and escape sequences. Parallel processing is difficult in the case of the VLD decoder, because the decoding of each token cannot begin until its starting position has been determined by decoding the previous token whose length is initially unknown.

U.S. Pat. No. 6,101,221 and U.S. Pat. No. 6,122,316, both assigned to LSI Logic Corporation, describe a purpose-designed ("hardware oriented") MPEG decoder systems. The first document in particular describes the "symbol extraction" by means of various state machines. "Floating point" registers are said to be used for storage of the data for the VLD, but this is understood to refer to the size of the registers only, and not to any similarity with the pre-processing to be described below in relation to the present invention. The "symbol extractor" or VLD in particular is designed to operate "with no CPU interaction". Some high—performance processors such as Trimedia TM1100 and TM1200 VLIW processors include dedicated VLC hardware, but others do not.

Further proposals for implementation of this part of the MPEG decoding process have been made by Daiji Ishii et al in *Parallel Variable Length Decoding with Inverse Quantisation for Software MPEG-2 Decoders*, IEICE Trans. Fundamentals, Vol E84-A, No. 12 (December 2001) pp. 3146–3151. In this proposal, look-up tables (LUTs) are used to decode the VLE tokens, using 17 bits of the bitstream at a time. A first table is used for decoding simultaneous pairs of short tokens, where these are found. A second LUT is used for decoding longer tokens. The second LUT is sub-divided into a number of smaller tables, recognising that the longer tokens generally begin with a run of 1s or 0s, so that a table having $2^{17}$ entries is not in fact necessary.

As to the detail of the process of using sub-divided LUT, Ishii et al merely make reference to Reza Hashemian: *Design and Hardware Implementation of a Memory Efficient Huffman Decoding*, IEEE Trans. Consumer Electronics Vol. 40, No. 3, pp. 345–352, August 1994. Hashemian explains how a small "cluster" of four bits is used as an index to a first sub-table, whose entry reveals either the desired decoded value or a pointer to a further sub-table, and how many further bits of the bitstream from the bitstream should be used as an index to access that further table. The further sub-table again may yield the desired output, or a reference to a yet further sub-table. Although this process achieves substantial reduction in the overall size of LUT that may be required, it is somewhat cumbersome, particularly when translated into a software implementation. It is stated in the Ishii paper that the second LUT "enables decoding one long codeword by one lookup operation". However, when one refers to the process actually proposed by Hashemian, it is apparent that one, two, three or even four look-ups may be required to decode a single token, depending on the content of the bitstream.

It is an object of the invention to provide an improved method of and apparatus for VLD functionality, and in particular one that can be implemented efficiently without dedicated hardware, by programming of available general-purpose microprocessors or DSPs.

According to one aspect of the present invention there is provided a method of decoding a variable length coded bitstream, said bitstream comprising a concatenation of tokens of differing lengths, wherein a look-up table is employed to obtain decoded values from successive portions of the coded bitstream, wherein longer tokens in the coded bitstream are characterised by strings of identical leading characters ('1's or '0's), and wherein said portions of the coded bitstream are pre-processed to obtain an index for said look-up table, said pre-processing step effectively replacing said strings with a fixed-length field representing the length of the string of leading characters to define the index using fewer bits than a maximum length of said tokens. While look-up tables are well known in principle, the size of table required to decode the longest token directly would be very large. A typical processing system relies on cache memory to achieve its high performance and, since such a large table would be too large to reside in the cache, the look-up method would not provide acceptable performance.

The inventor has recognised that typical VLC codebooks occupy only a fraction of the numerical range suggested by the maximum length of token, and that a very effective "compression" of the codebook can often be performed. The decoding step can then be performed with a relatively compact look-up table (LUT), rather than intensive computation In particular, the longer tokens in a typical codebook are characterised by strings of identical characters, particularly many leading zeros. In such a case the inventor has recognised that the compression effect mentioned above can be achieved using the floating-point conversion functions already provided by optimised hardware within a modern processor, and can be performed by a single look-up operation.

Accordingly, the pre-processing of the token may comprise conversion to exponent-plus-mantissa format. Alternatively, the pre-processing may comprise deriving a count of identical leading symbols by other means. Different processors will support these options to differing degrees, influencing the choice of implementation.

In a preferred embodiment, the method comprises:

(a) providing a look-up table (LUT) whose entries include decoded values corresponding to tokens potentially occurring within the coded bitstream;
(b) reading a portion of said coded bitstream;
(c) converting the received portion to exponent and mantissa components;
(d) using portions of said exponent and mantissa as an index to identify a specific entry within said look-up table (LUT) to extract a decoded value corresponding to a variable-length coded token contained within the received portion of the coded bitstream; and
(e) using the LUT entry to identify the start position of a next variable-length token and repeating steps (c) and (d) to decode successive tokens until an end token is decoded, reading further portions of said bitstream as necessary.

The variable length token may be selectively inverted prior to the conversion to exponent and mantissa format, in order to convert a token with leading '1's into a token with leading '0's.

Pre-processing may be performed differently according to characteristics of the bitstream portion being decoded. There may be provided plural look-up tables, selected according to pre-determined characteristics of the bitstream portion being decoded.

In MPEG, for example, some variable length codes are coded with leading 'ones', rather than leading 'zeros'. The floating point conversion can still be used if the tokens are inverted prior to inputting to the converter. A separate look-up table may be provided for use in such cases, depending on the properties of the token set.

A programmable processor may be used. The programmable processor may include pipelined processing, wherein different operations of decoding are performed at the same time. The programmable processor may have a pre-defined integer-to-floating point conversion operation, wherein said pre-processing step includes conversion of a portion of said bitstream from integer to floating point format using said pre-defined operation.

In one embodiment, pipeline processing is implemented such that the decoding of one token is performed concurrently with subsequent processing steps of a previously decoded value. Simple pipelining of decoding steps is not possible in the case of a variable-length code, because the position of each token is not known until the previous token is decoded. In an MPEG decoder, for example, re-ordering and inverse quantisation of each DCT coefficient may be started concurrently with decoding of the next token.

The decoded value extracted from the LUT entry may be used to determine further processing of the bitstream to obtain a final decoded value. In the MPEG VLC, for example, the token to be decoded may be an escape token signifying that the decoded value is to be found following the escape token in the bitstream itself.

The method may further comprise modifying the decoded value extracted from the LUT entry in response to a further portion of the bitstream. In the MPEG VLC, for example, most tokens end with a sign bit indicating that the level component of the run-level pair should be negated. Treating the sign bit as separate from the LUT index allows the size of table to be halved.

The start position of the next token may be derived from a token length field within each LUT entry.

Each LUT entry may also include control flags that are used to modify subsequent operation of the method.

The invention further provides an apparatus for decoding a variable length coded bitstream, the apparatus comprising means arranged to perform the steps of a method according to the invention as set for the above and as further defined in the appended claims.

It is an advantage of the invention that it can be implemented by suitable programming of general-purpose processor hardware, while may be supplied separately from the necessary programming code. Accordingly the invention yet further provides a record carrier or data storage other device wherein are recorded program instructions for causing a programmable processor to implement the steps of a method according to the invention as set forth above.

Embodiments of the invention will now be described, by way of example only, by reference to the accompanying drawings, in which.

Before embodiments of the invention are explained in detail, it is to be understood that the invention is not limited in its application to the details of construction and description or illustrated in the drawings. The invention is capable of being carried out in various other ways. Also, it is to be understood that the phraseology and terminology used herein is for the purpose of explanation and should not be regarded as limiting.

The invention will be illustrated in the context of a standard decoder for MPEG video data streams, such as are recorded on CD-Rom and DVD media, or sent by wire or wireless channels. The MPEG video Specification (ITU-T H.262) defines exactly the functions required for decompressing MPEG-coded video data, but not how it should be implemented in detail, which is left to the manufacturer.

Two key coding techniques are used to process motion picture sequences according to the MPEG specification: intra-frame coding, and non-intra-frame (inter-frame) coding. Both types of frame employ various lossy and lossless compression techniques performed relative to the information contained within each separate image of the video sequence. Non-intra-frame coding exploits additionally the temporal coherence between images, such as prediction using motion estimation, generating Prediction (P) frames and Bi-directional prediction (B) frames. The present invention does not relate to the motion features of MPEG, so the attributes of non-intra-frame coding will not be described in any further detail.

Figure 1:
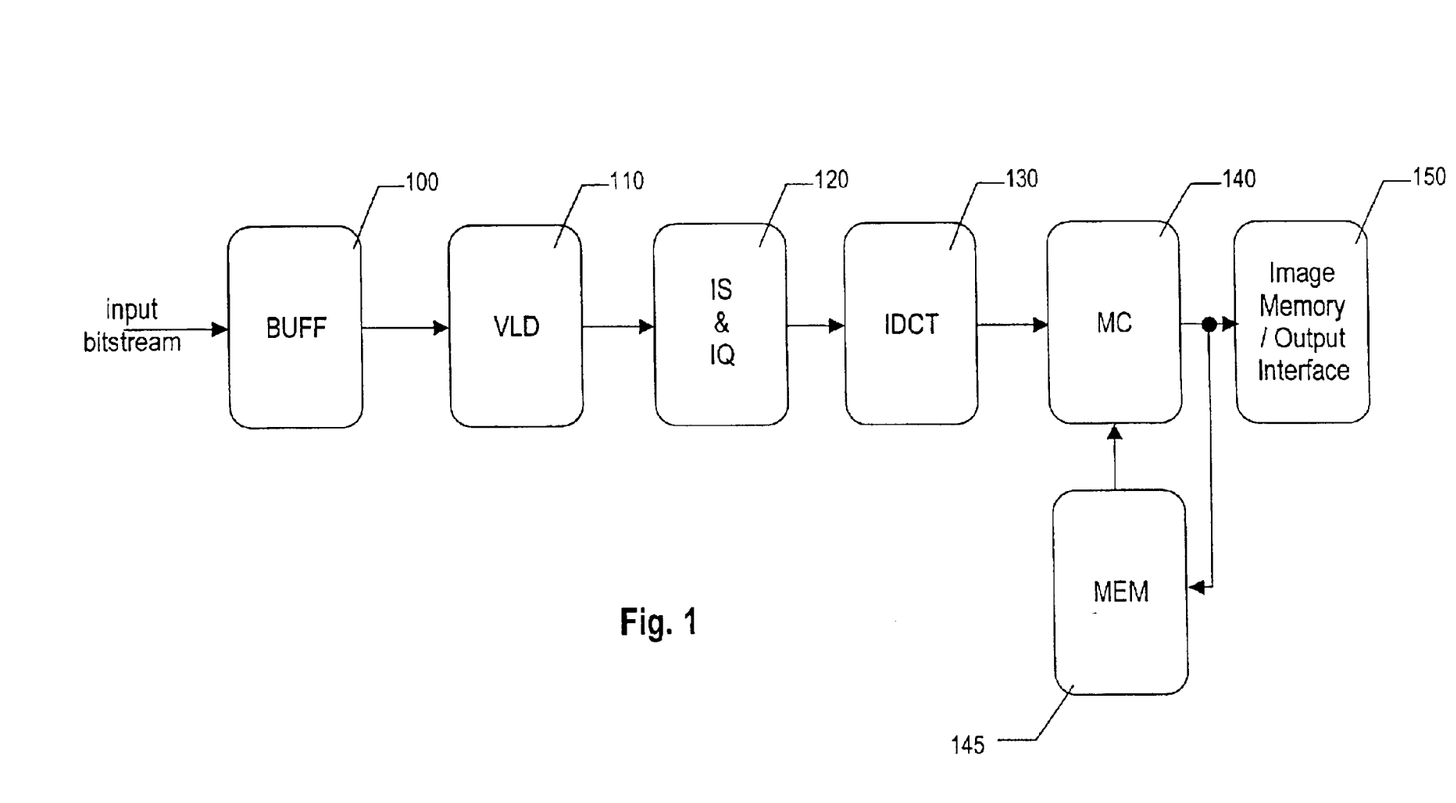
FIG. 1 is a functional block diagram of a MPEG video decoder incorporating a variable length decoder (VLD) according to the present invention.

FIG. 1 shows the steps of the MPEG decoder, comprising Bitstream buffer 100, Variable Length Decoder (VLD) 110, Inverse Scan (IS) and Inverse Quantiser (IQ) 120, Inverse Discrete Cosine Transform (IDCT) 130 Motion Compensator (MC) 140 and Output Interface 150. The decoder may be implemented in dedicated hardware, or by a processor as a series of process steps, or a combination of both. The present disclosure assumes that these steps, particularly the VLD and IS/IQ steps are implemented by programming a microprocessor, although it may be a VLIW or other processor optimised for image processing The action of the steps shown is as follows:

Input bitstream buffering, at 100 is for receiving the video stream and forming a time-flexible queue to allow subsequent process steps to decode the video at differing rates to the input video rate. At this point audio and other data maybe separated and routed to its own decoder.

Variable Length Decoding, at 110 is for converting variable-length MPEG tokens to their corresponding values, such as quantised DCT coefficients.

Inverse Quantisation, at 120 obtains actual values for the DCT coefficients according to the values of chosen quantisation and scale factor matrices and an Inverse Scan step re-forms a coefficient matrix from the stream of tokens according to a predetermined sequence, usually a zigzag.

Inverse Discrete Cosine Transforming step 130 is for recomposing the DCT coefficients into the blocks of pixel values that they represent.

Where the image has been non-intra coded, motion compensation is performed at 140 to combine the decoded pixel values with values from neighbouring images in the image sequence.

Output interfacing is performed at 150 to represent the video in a suitable format such as a two dimensions video image in memory or a digital video stream for example.

Figure 2:
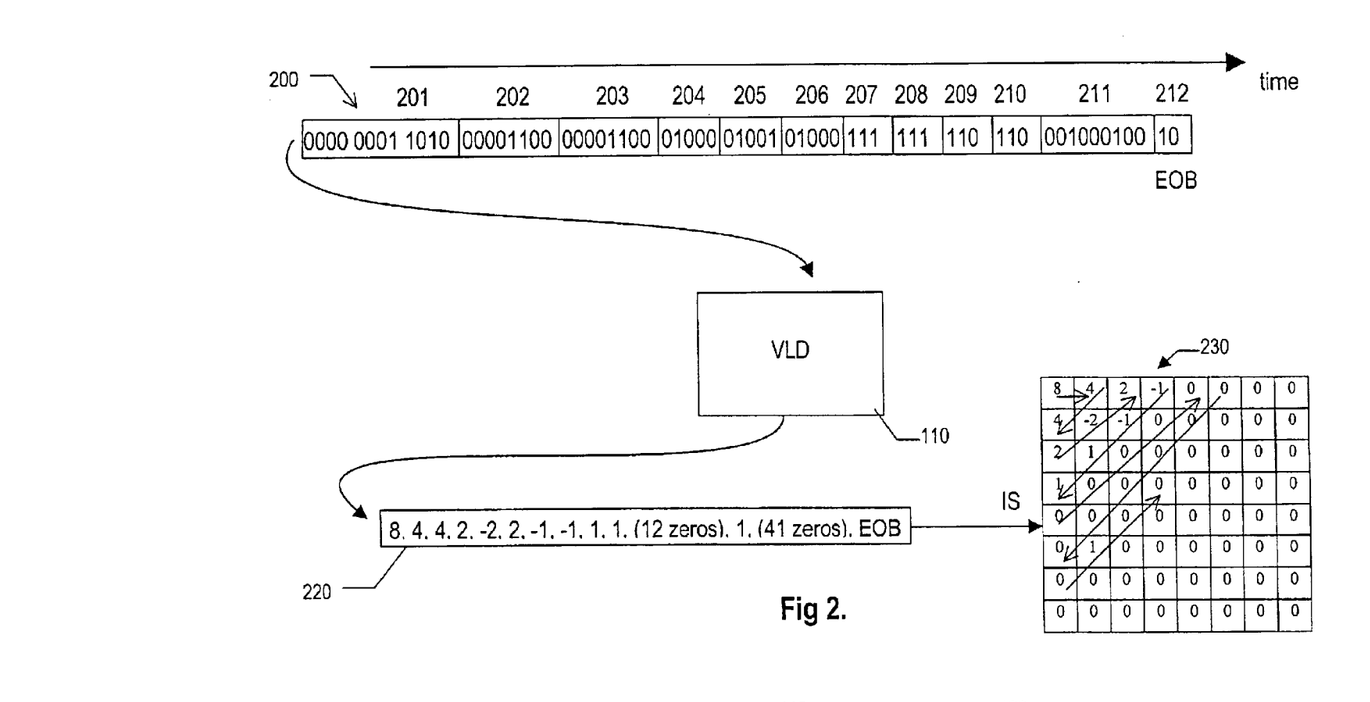
FIG. 2 shows an example of sequence of variable length tokens entering the VLD of FIG. 1 and the desired decoded sequence of coefficients.

FIG. 2 shows what operations the VLD 100 must perform on an example bit stream 200 of variable length tokens 201–212 to convert them into sequences 220 of run-length and level, then using Inverse-Scan function IS, to inverse 'zig-zag' scan them into an 8×8 coefficient matrix 230$m$ for subsequent passing to the Inverse Quantiser (IQ)

The incoming bitstream 200 comprises simply a string of 1s and 0s. The desired block of coefficients 230 is represented by a series of twelve tokens 201–212. Although the token boundaries are shown, the decoder at the outset does not know where they are, nor how many tokens there may be to represent each block of coefficients. The start of the sequence is known from its context, however, and each token can be found once the previous token has been recognised (at least partially decoded). The MPEG specification H.262 has a table B.14 that defines the tokens and their meaning n this example. Other tables B.15 and B.16 are provided for use in different circumstances.

In the example shown, VLD process 110 converts the tokens 201–212 into a decoded coefficient sequence 220, scanning block 230 in the defined zig-zag sequence (indicated by arrows in the drawing). Tokens 201–210 each represent a single coefficient with (quantised) value 8, 4, 4 etc. Token 211 on the other hand, represents a run of twelve zeros followed by a 1. There are 41 zeros after the last non-zero coefficient and these are all represented by token 212 comprising a special "end of block" code EOB. The most common values a runs have their own tokens defined in the table, with token lengths increasing as the values become less common in a typical image. Rarer values or runs can be represented explicitly, following a special "escape" token (ESC). The longest tokens in MPEG table B14 are 16 bits long plus a sign bit. In the example, 64 coefficients quantised to at least four bits each have been compressed by the variable length code into only 61 bits. The exact degree of compression depends on the image content, and the degree of quantisation applied.

Although motion estimation is particularly challenging at the encoder side, the VLD 110 is typically the most computationally intensive portion of the decoder in software-based implementations, as it operates on a bit-wise basis. General purpose processors are not geared to monitor every bit of the stream, when the boundaries between variable length tokens are random and not aligned to byte and word boundaries in memory. The VLD process 110 has to operate at speeds up to the input bit-rate to produce the coefficient data corresponding to each token, as defined in the MPEG standard, for reforming an 8×8 coefficient matrix.

Conventionally the algorithms required to perform VLD at this speed have been supported in hardware, to reduce burden on the processor, although software implementation is used where processor loading is not an issue. One method for increasing throughput is to use complex, high-speed logic functions, steering logic and parallel processing. An example of such is provided in U.S. Pat. No. 6,101,221, describing a system and method of decoding fixed length data words comprising variable length objects at a speed such that a variable length token is decoded every clock cycle. It achieves an increased decoder throughput rate by effectively pipelining operations using multiple registers and complex data steering logic, in combination with parallel-configured multiplexers and IDCT processors. Although increasing decoder throughput by processing many variable length tokens at the same time, there is no improvement made to the method or apparatus for deriving coefficient run length and level data from the variable length tokens. A software implementation of this technique is neither suggested nor practicable.

Figure 3:
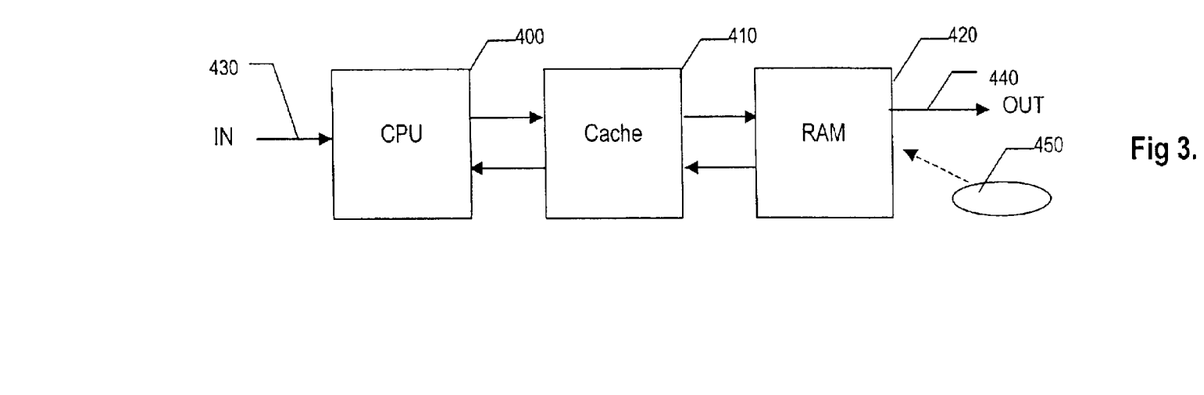
FIG. 3 is a generic block diagram of a general-purpose processor used to implement the decoder of FIG. 1.

FIG. 3 shows a general-purpose processor 400 employing a cache 410 between it and the processor memory 420. CPU 400 may be the main processor of a PC workstation or it may be an auxiliary processor dedicated to MPEG decoding, or to video processing generally. The processor and memory may alternatively form part of a dedicated MPEG player, such as a DVD player or games console. CPU 400 is assumed to be performing at least the VLD process, but preferably the entire decoding process of FIG. 1 is performed within this processor. To illustrate this the diagram shows a video bitstream IN 430 entering the processor, although another method for inputting the data would suffice, such as DMA transfers into memory. Likewise, a video output OUT 440 is shown emerging from the memory, although it could in practice require processor interaction to read, format and output the data. In operation, programs, input data and decoded images generated by CPU are held in main memory 420. As is well known, however, often-used data or process steps are extracted from the cache (when available), in preference to obtaining the same from the slower memory 420. Programme code (instructions) for the processor to implement the VLD processes described herein may be pre-installed (firmware) or may be supplied separately on a record carrier such as a CD-ROM or floppy disk 450. The use of a cache releases the power of the processor, which would otherwise be negated by the limited bandwidth of main memory.

As mentioned above the MPEG specification provides tables which define VLC tokens and their corresponding DCT coefficient run length and level values (tables B.12 to B.16 of ITU-T Recommendation H.262). One approach to decoding the tokens directly would be reproducing the MPEG tables completely as look-up tables (LUT's) in memory. The table could contain entries for each token value, defining the run length, the level and the length of the token (to identify the start of the next token). LUT's are well-known in principle as an alternative to arithmetic and logical processing. Unfortunately, MPEG variable-length token size can be up to 16 bits (plus a sign bit which can be processed separately). To store such a table entirely in cache memory would require a cache length of $2^{16}$, that is 65536 entries. The size of each entry will be at least two bytes and probably more. Such a large table is unattractive, because of its sheer size, and comprises much redundant information and empty entries. More seriously, such a large table is unlikely to reside entirely in the cache memory 410 at any given time, and the incidence of cache misses and stalling of the process would be very high, negating the benefit of the cache. Therefore, although the use of a look-up table is superficially attractive, the performance of such an implementation would fall short of requirements in practice.

The following paragraphs disclose an improved method and apparatus for converting a variable length token to its corresponding run length and level values, using a small amount of processing and smaller LUT than would at first sight be necessary. This is beneficial both in itself, and also in reducing the disruption to smooth decoding caused by events such as cache stalls or flushes in a practical computer system. Further paragraphs provide application examples, showing how the new method and apparatus can be applied to a VLIW architecture video processor and how efficient pipelining of video process functions provides an efficient MPEG decoder.

Figure 4:
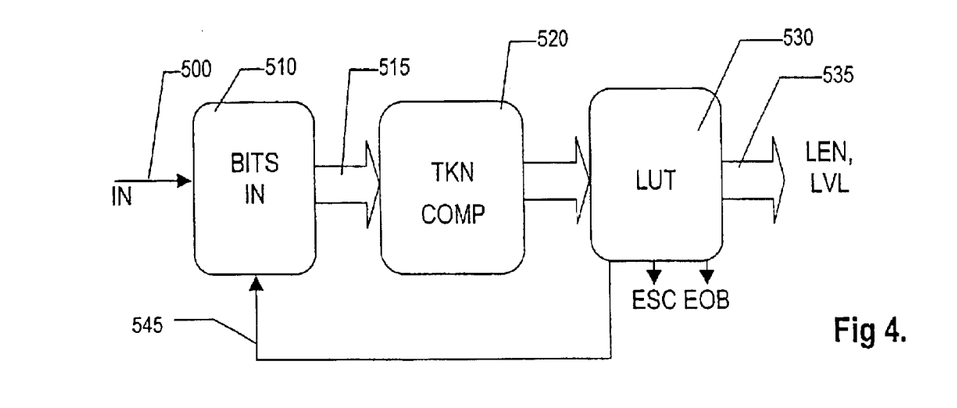
FIG. 4 shows schematically the VLD process in the decoder of FIG. 1, wherein a Look Up Table (LUT) preceded by a "token compression" step.

FIG. 4 provides a diagrammatic representation of an improved VLD process, comprising input step 510, token compression step 520 and table look-up step. A stream of bytes containing input bitstream is received at 500, chunks of data beginning with a new token are read at 515 into the compression step 520, and decoded length and level values, or EOB and ESC signals are read from the LUT 530. The processing of the escape and sign bits is omitted for clarity, but is simple to implement. The input step 500 for the next token is controlled on a bit by bit basis in response to a token length value read from the look-up table 530 at 545.

Table 1 below provides an example of the table entry format: the table width is shown as, but not limited to, 32-bits.

TABLE 1

| Byte | Contents |
|---|---|
| 0 | FLAGS . . . <br> LSB set if input variable length token equals "end of block" (EOB). <br> Bit 2 set if input variable length token equals "escape code" (ESC). |
| 1 | LVL - Level value times 2. |
| 2 | LEN - Run length plus 1. |
| 3 | Length of input variable length token. |

The EOB and ESC codes are decoded to separate flags, and other flags could of course be provided in MPEG or different coding system.

In this example the level value is stored as twice the actual level in order to simplify subsequent processing. Specifically, a value of twice the level is actually required in an arithmetic function specified by MPEG for Inverse Quantisation. The sign flag is decoded separately and inspected to determine whether negation of the overall result is required, which also simplified the arithmetic in practice. In a similar fashion, the run level has been modified to suit subsequent processing steps. Other forms of adapting the LUT entry contents to suit the processing may be used, and is not restricted to the examples shown. Each byte in the table entry is not fully used, but packing the data more closely would bring overhead in disentangling the different components. By virtue of the token compression step (to be described in more detail below), the number of entries in the LUT is reduced to such a level that the size of individual entries is not a great concern.

The feasibility and nature of token compression step 520 will depend on the structure of the VLC codebook (the set of tokens). A little creative thinking and optionally some additional pre- or post-processing may be required in certain cases. In the case of the MPEG DCT coefficient tables B.14 and B15, tokens for the most part comprise between 0 and 11 leading zeros and a code length of 2 to 6 bits, plus sign bit. In this case, provided certain exceptions are dealt with in a manner described later, effective token compression can be implemented by a simple floating-point conversion of a batch of bits from the input stream, to give a number in Exponent and Mantissa format. After a little re-alignment this yields a shorter token in a format suitable for indexing a smaller look-up table of DCT coefficients to provide a corresponding run length and level. The table can be built such that the table entries are right for the exponent value addressing those entries. This can mean that the beginning of the table may never be used since the selected part of the exponent may never be zero for the range of counts of leading zeros in the code sequence we may be decoding. In this case we may choose to offset the table base address that we use so that the lowest exponent value that arise in practice will address the first memory locations in the table, without wasted space in the table, or the need to do further arithmetic on the index to make it address the right portion of the table.

Typical apparatus used to achieve the re-coding is a floating-point (24- or more bit) register, an integer to floating point conversion block and a shift register. Processors such as the Intel Pentium™ series include floating point units as a matter of course. Even within a custom IC, floating-point units can be included as "off-the-shelf" designs, without having to develop and test a specific VLD hardware block of the type shown in the cited references.

Figure 5:
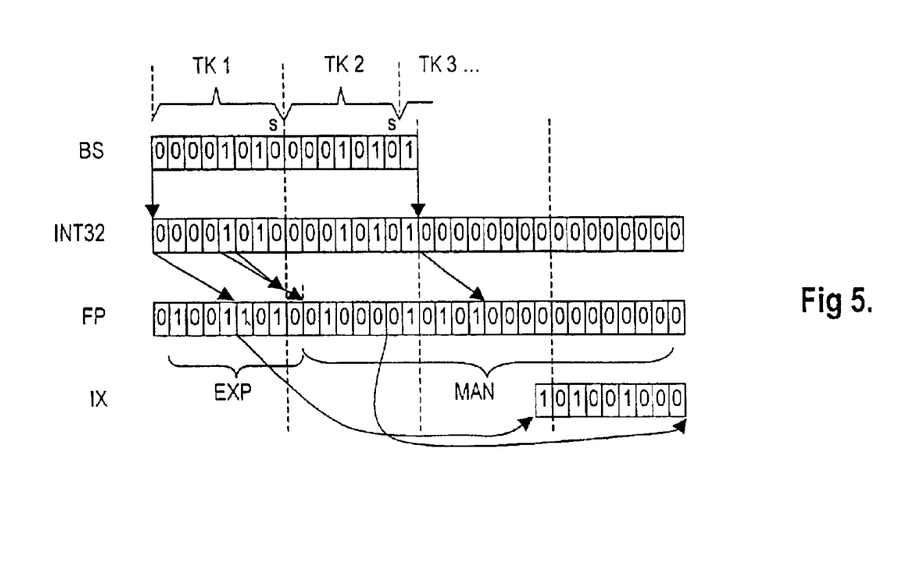
FIG. 5 illustrates the action of the token compression step in the process of FIG. 4.

FIG. 5 illustrates at a bit level the action of the token compression process 520 in the present embodiment. The following steps can be implemented more or less directly in a standard microprocessor, using standard conventions for the format of integer and floating-point number representations:

Input 16 bits 'BS' of the bit-stream waiting to be decoded (containing one or more variable length tokens) are input as a 16-bit word in the upper half of a zero-loaded 32-bit register "INT 32". Since the maximum token length is 16 bits plus sign bit, the register then contains at least one complete token (TK1), but possibly some of the subsequent token(s) (TK2 etc) as well. In the example illustrated, TK1="0000101" followed by sign bit s=0

Next perform a floating-point conversion on the contents of the register (unsigned integer to floating point), with result 'FP'. At this point, following the IEEE conventions, the number of leading zeroes in the token becomes transformed to corresponding exponent value EXP and the remaining bits, less the first '1', become shifted into a fixed mantissa portion MAN. In the example illustrated first '1' appears in bit 27 of the unsigned integer INT32, making the exponent 27. By convention the IEEE format exponent field thus equals 127+27=154, or 100 1011010 in binary. Where the processor provides a choice, the mode of conversion selected should be one which rounds down, if rounding up could change a significant bit where a long token is being decoded.

From the result 'FP', combine the lowest 4 bits of the exponent (which identifies the number of leading zeros of the token) with the upper 5 bits of the mantissa (which equates to the 5 bits that followed the first '1'of the token) to form a 9-bit index value 'IX'.

Use the 9-bit word 'IX' as an index for the LUT to extract a four-byte entry of the form shown in Table 1 (EOB, ESC, LVL, LEN).

Process EOB and ESC appropriately. For other codes, shift in the sign bit from the input bitstream BS to LVL to complete the decoded level value.

The result is that tokens of up to 16 bits in length are re-coded into an index just 9 bits long. Note that the selected 5 bits of the mantissa will at times contain up to 4 bits of the next token. This is accommodated by ensuring that the LUT entries in such cases are identical, regardless of the value of the 4 bits of the next token. As only 9 bits are required to access the entire LUT, at 29, i.e. 512 entries maximum, providing advantages of higher speed and reduced memory requirements. Furthermore, as the number of leading zeros cannot exceed 11 according to the MPEG 'decode table zero' specification, the exponent (upper) part of the index will in fact be restricted to just 12 of the possible 16 banks, meaning that only 384 LUT entries are required in order to support all the coding entries. This size of table can be readily handled by a cache, without recourse to stalls. As this part of the MPEG decoding is so arithmetically intensive, the efficient utilisation of such a small LUT (approximately 1 k byte) residing in cache memory results in significant increases in throughput. The sign bit is handled separately and as such does not affect the size of the LUT, although it may be handled simultaneously if the cache is large enough.

The same principle applies to other table coding structures, with or without additional pre- and/or post-processing. The above example applies to MPEG 'decode table zero' (B14 in ITU-T H.262). In the case of the MPEG coefficient 'decode table one' entries (table B15), however, amongst the leading-zero tokens (codewords) there exist some tokens with a number of leading '1's. Floating point conversion of such numbers will not result in compression of the token space. To overcome this discrepancy, however, a simple additional test is performed to check for a threshold number of leading ones, for example four, and if so to bit-invert the variable length token and use a separate LUT to the one that handles the leading-zero entries. The MPEG DCT coefficient table B15 can be described in this way by a pair of condensed tables, if not a single table. Furthermore, the principle extends to different quantities of leading zeros or code lengths, merely requiring a different selection and shifting of bits to the example shown above for 'decode table zero' entries.

Additional pre-processing is also applied in the preferred embodiment to avoid a case where two token concatenated in the bitstream can lead to a run of '0's longer than the longest run in a valid token. The ITU-T H.262 tables do not include symbols of all zeros, to avoid the problem known as "start code emulation". However, table B.15, for example, includes a token which is composed entirely of nine '1's (eight '1's plus sign='1'), and which may be followed by another token beginning with a number of '1's. When these are inverted as described above, this becomes a symbol of many zeros, to be converted to exponent and mantissa format for use as LUT index as described above. Converting this to floating point directly would yield an exponent beyond the range necessary for decoding the vast majority of the tokens. Rather than provide a larger table for these circumstances, the preferred embodiment includes a step of forcibly setting an appropriate bit of the value INT32, prior to performing the floating point conversion. This forced '1' bit prevents the exponent going outside the expected range. In the example of MPEG-2 Tables B.14 and B.15, this forcing step is only applied after inverting symbols beginning with leading '1's, as explained in the preceding paragraph. In the case of the MPEG-2 table B.15 with a maximum all-zero token length of eight bits (after inversion and not counting the sign bit), a simple OR operation using a mask 0x00800000 is performed to force the ninth bit (bit 23 in INT32) to '1'.

It will be appreciated that the original value of INT32 should be preserved for use when the bits are shifted up and interpreted as part of the next token. Otherwise the bit forcing would corrupt the decoding of the next token.

The skilled person can adapt these bit-forcing or other techniques when designing a decoder for different code tables, to trap cases where the exponent might go out of range. It is also useful to protect against corrupted bitstreams, by forcing a bit sufficient to limit the number of leading '0's within a known range. To avoid corrupting the tokens, the forced bit in general must be positioned at the maximum token length, rather than the maximum length of leading zeros expected in the valid bitstream. This requires the provision of a larger table, to avoid the erroneous tokens yielding an index out of range. However, the extra portion of the table will very rarely be accessed, and therefore does not contribute to cache occupancy or cache miss frequency in normal operation. Where an error is detected, a cache miss will be a minor consideration, as decoding will be comprehensively disrupted.

As an alternative to the inversion and a separate table described above, it may also be possible to deal with groups of "leading ones" tokens by use of signed floating point processing, although additional bit-level operations may be required that would negate the apparent speed advantage.

For a practical embodiment, using a high-performance processor, parallel performance of certain operations or "pipelining" is generally attractive. The inventor has found opportunities for pipelining in a software-based MPEG decoder in spite of apparent obstacles, as will now be explained. A suitable processor architecture for video applications is the VLIW (very long instruction word) processor, although any parallel architecture with features supporting MPEG decoding will suffice.

Figure 6:
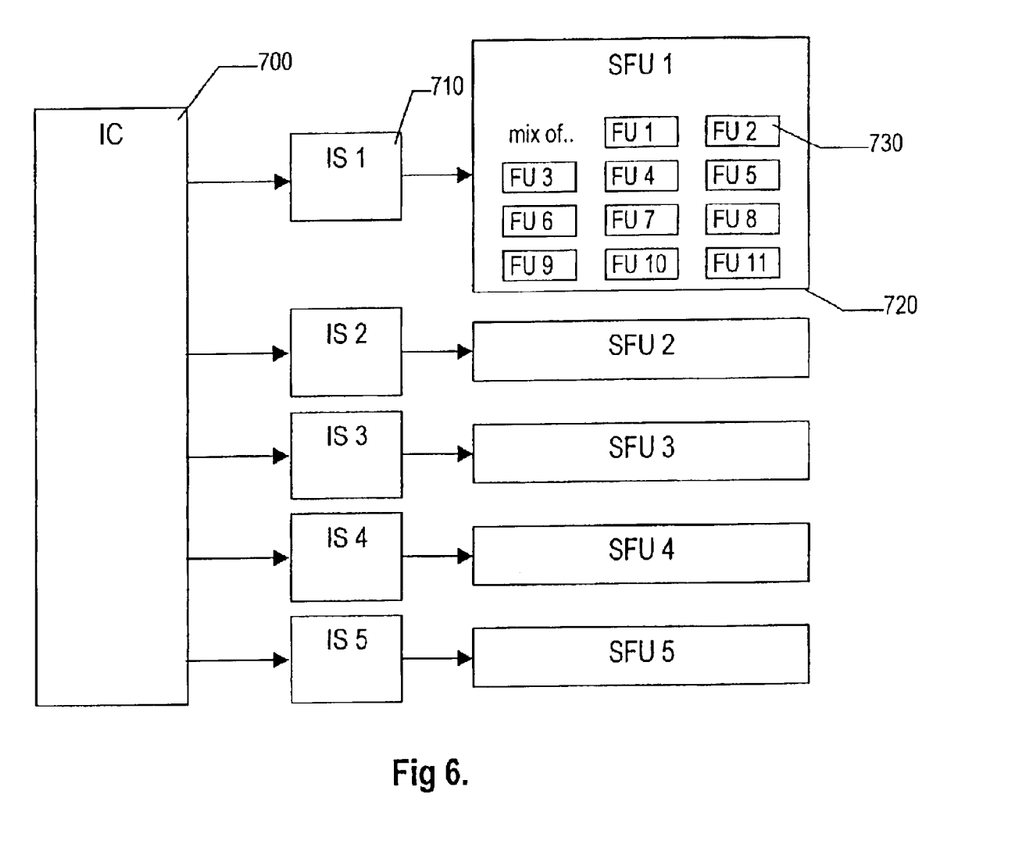
FIG. 6 is a block diagram of the instruction handling portion of an example VLIW processor architecture suitable for pipelining several MPEG video processing operation including a VLD process of FIG. 4.

FIG. 6 shows a block diagram of the instruction handling portion of an example VLIW processor, comprising a single Instruction Cache 'IC' 700, five Issue Slots IS1 ... IS5 710 and five sets of Functional Units 'SFU1' ... 'SFU5' 720, each of which contains a selection of functional units 'FU1' ... 'FU11' 730. There are different types of functional unit for different types of operation, such as integer arithmetic, floating point, shift and memory. Typically the Functional Units will be specialised to some degree, including only a subset of the possible functions. For example, one or two units may provide branching functions, others may provide memory interface functions, and others may provide floating point arithmetic.

Table 2, below, provides the functional unit mix for the example VLIW architecture. The exact nature of the functions is not important for an understanding of the present embodiment.

TABLE 2

| Issue Slot Function type | 1 | 2 | 3 | 4 | 5 |
|---|---|---|---|---|---|
| Const | y | y | y | y | y |
| Alu | y | y | y | y | y |
| Dmem |   |   |   | y | y |
| Shifter | y | y |   |   |   |
| Dspalu |   | y |   | y |   |
| Dspmul |   |   | y | y |   |
| Branch |   |   | y | y | y |
| Falu | y |   |   | y |   |
| Ifmul |   | y | y |   |   |
| Fcomp |   |   |   | y |   |
| Ftough |   |   | y |   |   |

FIG. 6 represents the instruction flow from the instruction cache to the functional units that actually execute instructions. The compiler for this processor generates operations at each time slot in groups of five. Therefore up to five operations are sent to their appropriate issue slot at the same time. During compilation the compiler seeks to organise operations to achieve the maximum parallelism, but is unable to schedule an instruction before the required input data is available from execution of a previous instruction. This scheduling problem may be as a result of latency: the latency of an instruction is the delay from the time of execution of the instruction until the result is available. Most processors have operations that exhibit latencies of more than one clock cycle, resulting in some operations being not available for use by instructions starting in the following clock cycle.

To assist the compiler several tasks can be processed at the same time, for example performing the same operation on several data items at once (loop unrolling). However, with MPEG bitstream variable length token decoding, because the location of the boundary between the tokens is unknown it is not possible to start decoding the second variable length token until most of the first token has been decoded. This problem is circumvented in the proposed implementation by pipelining the VLD, IS and IQ operations, but for different coefficients, as shown in the example below.

Figure 7:
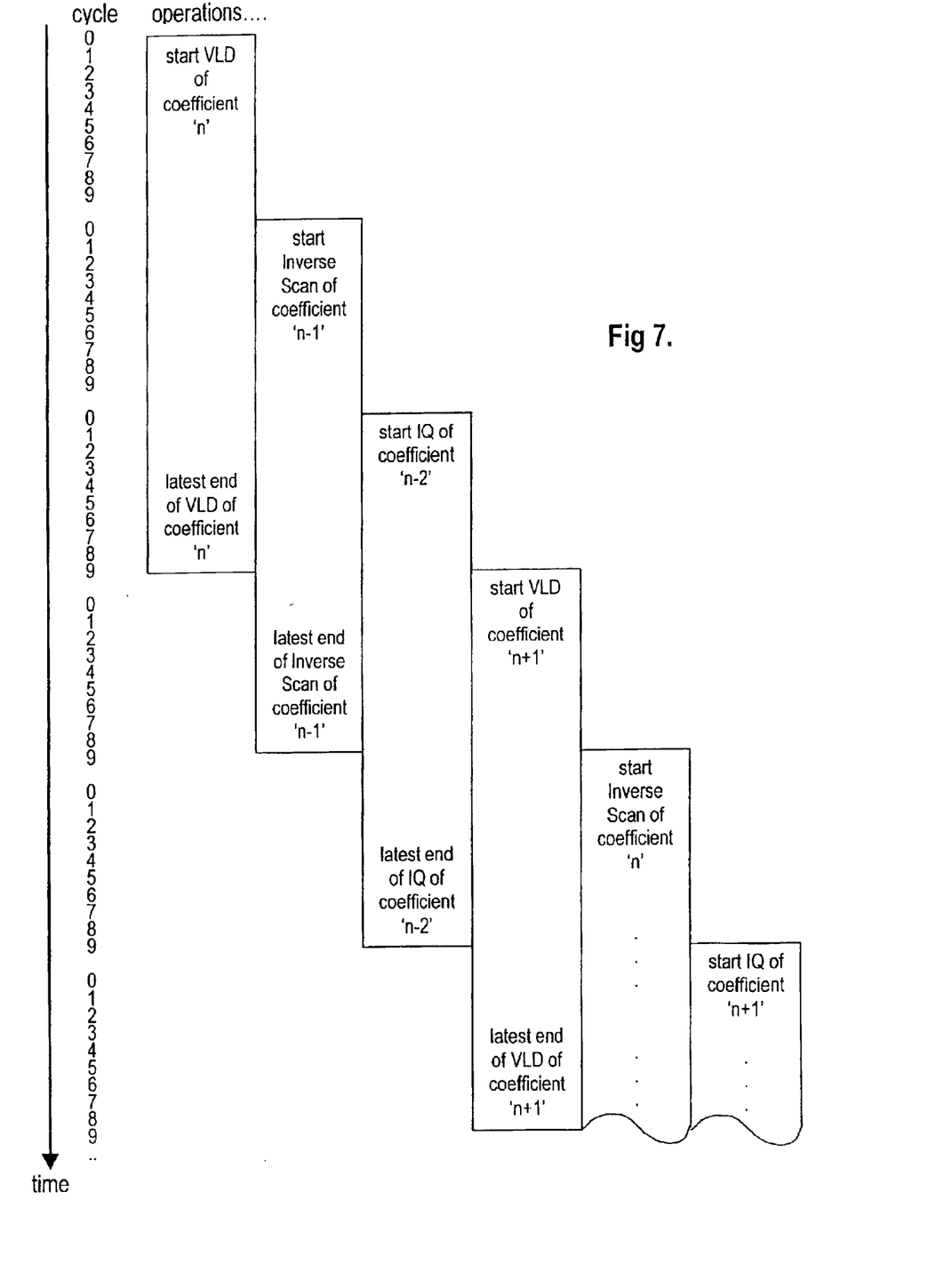
FIG. 7 shows how with suitable compilation maximum utilisation of the pipeline video processor is achieved by pipelining the VLD process with other steps in the MPEG decoder process.

FIG. 7 shows how, with suitable compilation, maximum utilisation of the processor is achieved. A three-pass process is adopted, whereby the VLD, IS and IQ operations are all completed within three runs of the code.

Table 3, below, shows how the pipelined VLD, IS and IQ operations in 3 passes are incorporated into just ten VLIW 5-slot cycles, resulting in this example of just 6 processor slots unused out of a possible 50 and a very efficient utilisation of processor resources.

TABLE 3

| Proc. | Issue Slot | | | | |
|---|---|---|---|---|---|
| cycle | 1 | 2 | 3 | 4 | 5 |
| 0 | 2 shifter | 2 shifter | 2 alu | 2 const |   |
| 1 | 2 shifter | 2 shifter | 2 ifmul | 2 alu | 2 dmem |
| 2 | 1 falu | 1 shifter | 2 alu | 3 alu | 2 alu |
| 3 | 2 shifter |   | 1 dmem | 1 dmem |   |
| 4 | 2 alu | 2 ifmul | 2 alu |   | 1 dmem |
| 5 | 2 alu | 2 alu | 2 alu | 1 dmem |   |
| 6 | 2 shifter | branch | Branch | 3 alu | 1 alu |
| 7 | 3 dspalu | 2 shifter | 2 alu | 1 alu | 2 dmem |
| 8 | 2 alu | 1 alu | 1 alu | 1 alu |   |
| 9 | 1 shifter | 1 shifter | 1 alu | 3 alu | 3 dmem |
| 0 | Repeat. |   |   |   |   |

The numbers before each operation relate to the pass through the processing steps, as shown also at the left hand side of FIG. 7. The instruction sequence illustrated is designed to operate as a loop without interior branches, handling three tokens at a time. A more generalised version of the code is provided to cope with buffer underflow, EOB and escape cases, either resuming the loop, or exiting completely after the EOB Symbol The combination of the VLD using token compression and LUT, and the pipeline architecture of a VLIW provides an efficient and high-speed MPEG decoder. Such architecture will also support the use of the full extent of the MPEG specification, such as motion frames and audio playback and synchronisation. The skilled reader will appreciate that numerous variations are possible within the principles of the apparatus described above. Accordingly it will be understood that the embodiments illustrated herein are presented as examples to aid understanding, and are not intended to be limiting on the spirit or scope of the invention claimed. Furthermore, the skilled person will appreciate that the present invention can be applied to any other methods or apparatuses for decoding variable length codes, in a variety of applications in audio, video, voice and general data compression.

What is claimed is:

1. A method of decoding a variable length coded bitstream, said bitstream comprising a concatenation of tokens of differing lengths, wherein a look-up table is employed to obtain decoded values from successive portions of the coded bitstream, wherein longer tokens in the coded bitstream are characterised by strings of identical leading characters ('1's or '0's), and wherein said portions of the coded bitstream are pre-processed to obtain an index for said look-up table, said pre-processing step effectively replacing said strings with a fixed-length field representing the length of the string of leading characters to define the index using fewer bits than a maximum length of said tokens.

2. A method as claimed in claim 1, wherein each token is decoded by a single look-up operation.

3. A method as claimed in claim 2, wherein the step of pre-processing of the token comprises conversion to exponent-plus-mantissa format.

4. A method as claimed in claim 3, wherein the method comprises the steps of:
   (a) providing a look-up table (LUT) whose entries include decoded values corresponding to tokens potentially occurring within the coded bitstream;
   (b) reading a portion of said coded bitstream;
   (c) converting the received portion to exponent and mantissa components;
   (d) using portions of said exponent and mantissa as an index to identify a specific entry within said look-up table (LUT) to extract a decoded value corresponding to a variable-length coded token contained within the received portion of the coded bitstream;
   (e) using the LUT entry to identify the start position of a next variable-length token and repeating steps (c) and (d) to decode successive tokens until an end token is decoded, reading further portions of said bitstream as necessary.

5. A method as claimed in claim 2, wherein the variable length tokens are selectively inverted prior to the conversion to exponent and mantissa format, in order to convert a token with leading '1's into a token with leading '0's.

6. A method as claimed in claim 1, wherein there are provided plural look-up tables, selected according to pre-determined characteristics of the bitstream portion being decoded.

7. A method as claimed in claim 1, performed using a programmable processor having a pre-defined integer-to-floating point conversion operation, wherein said pre-processing step includes conversion of a portion of said bitstream from integer to floating point format using said pre-defined operation.

8. A method in claimed hi claim 1, wherein pipeline processing is implemented such that the decoding of one token is performed concurrently with subsequent processing steps of a previously decoded value.

9. A method as claimed in claim 1, wherein the start position of a next token is derived from a token length field within each LUT entry.

10. A method as claimed in claim 1, wherein said LUT entries also include control flags that are used to modify subsequent operation of the method.

11. An apparatus for decoding a variable length coded bitstream, said bitstream comprising a concatenation of tokens of differing lengths, wherein longer tokens in the coded bitstream are characterised by strings of identical leading characters ('1's or '0's), the apparatus comprising:
   means for storing a look-up table;
   means for receiving successive portions of data representing said coded bitstream;
   means for addressing said table in response to the received data so as to obtain decoded values from successive portions of the coded bitstream; and
   means for pre-processing said portions of the coded bitstream to obtain an index for said look-up table, said pre-processing step effectively replacing said strings with a fixed-length field representing the length of the string of leading characters to define the index using fewer bits than a maximum length of said tokens.

12. An apparatus as claimed in claim 11, wherein each token is decoded by a single look-up operation.

13. An apparatus as claimed in claim 12, wherein the pre-processing of the token comprises conversion to exponent-plus-mantissa format.

14. An apparatus as claimed in claim 13, wherein the pre-processing means comprises:
   (a) means for converting the received portion to exponent and mantissa components;
   (b) means for using portions of said exponent and mantissa as an index to identify a specific entry within said look-up table (LUT) to extract a decoded value corresponding to a variable-length coded token contained within the received portion of the coded bitstream; and
   (c) means for using the LUT entry to identify the start position of a next variable-length token,
   means (a) and (b) being arranged to operate repetitively to decode successive tokens until an end token is decoded.

15. An apparatus as claimed in claim 12, wherein the pre-processing means is operable to invert the variable length tokens selectively prior to the conversion to exponent and mantissa format, in order to convert a token with leading '1's into a token with leading '0's.

16. An apparatus as claimed in claim 11, wherein there are provided plural look-up tables, selected by said addressing mean, according to pre-determined characteristics of the bitstream portion being decoded.

17. An apparatus as claimed in claim 11, wherein said means are implemented by a programmable processor having a pre-defined integer-to-floating point conversion operation, wherein said pre-processing step includes conversion of a portion of said bitstream from integer to floating point format using said pre-defined operation.

18. An apparatus as claimed in claim 11, wherein pipeline processing is implemented such that the decoding of one token is performed concurrently with subsequent processing steps of a previously decoded value.

19. An apparatus as claimed in claim 11, wherein the start position of a next token is derived in operation from a token length field within each LUT entry.

20. An apparatus as claimed in claim 11, wherein said LUT entries also include control flags that are used to modify subsequent operation of the apparatus in operation.

21. A record carrier wherein are recorded program instructions for causing a programmable processor to perform the step, of a method according to claim 1, or to implement an apparatus for decoding a variable length coded bitstream, said bitstream comprising a concatenation of tokens of differing lengths, wherein longer tokens in the coded bitstream are characterised by strings of identical leading characters ('1's or '0's), the apparatus comprising:
   means for storing a look-up table;
   means for receiving successive portions of data representing said coded bitstream;
   means for addressing said table in response to the received data so as to obtain decoded values from successive portions of the coded bitstream; and means for pre-processing said portions of the coded bitstream to obtain an index for said look-up table, said pre-processing step effectively replacing said strings with a fixed-length field representing the length of the stung of leading characters to define the index using fewer bits than a maximiun length of said tokens.

* * * * *